US008583429B2

(12) United States Patent
Benesty et al.

(10) Patent No.: US 8,583,429 B2
(45) Date of Patent: Nov. 12, 2013

(54) SYSTEM AND METHOD FOR SINGLE-CHANNEL SPEECH NOISE REDUCTION

(75) Inventors: Jacob Benesty, Montreal (CA); Yiteng Huang, Bridgewater, NJ (US)

(73) Assignee: Wevoice Inc., Bridgewater, NJ (US)

( * ) Notice: Subject to any disclaimer, the term of this patent is extended or adjusted under 35 U.S.C. 154(b) by 526 days.

(21) Appl. No.: 13/018,973

(22) Filed: Feb. 1, 2011

(65) Prior Publication Data

US 2012/0197636 A1 Aug. 2, 2012

(51) Int. Cl.
*G10L 21/02* (2013.01)
*H04B 15/00* (2006.01)

(52) U.S. Cl.
USPC .......................................... 704/226; 381/94.1

(58) Field of Classification Search
USPC ......................... 704/226–228; 381/94.1–94.9
See application file for complete search history.

(56) References Cited

U.S. PATENT DOCUMENTS 6,453,289 B1 * 9/2002 Ertem et al. .................. 704/225
7,492,889 B2 * 2/2009 Ebenezer ................. 379/392.01
2011/0096942 A1 * 4/2011 Thyssen ....................... 381/94.1
2011/0231185 A1 * 9/2011 Kleffner et al. ............... 704/226
2011/0305345 A1 * 12/2011 Bouchard et al. ............ 381/23.1

OTHER PUBLICATIONS

Benesty et al. "A Widely Linear Distortionless Filter for Single-Channel Noise Reduction", Signal Processing Letters, IEEE, vol. 17, No. 5, pp. 469,472, May 2010.*

* cited by examiner

*Primary Examiner* — Samuel G Neway
(74) *Attorney, Agent, or Firm* — Kenyon & Kenyon LLP

(57) ABSTRACT

A system and method may receive a single-channel speech input captured via a microphone. For each current frame of speech input, the system and method may (a) perform a time-frequency transformation on the input signal over L (L>1) frames including the current frame to obtain an extended observation vector of the current frame, data elements in the extended observation vector representing the coefficients of the time-frequency transformation of the L frames of the speech input, (b) compute second-order statistics of the extended observation vector and of noise, and (c) construct a noise reduction filter for the current frame of the speech input based on the second-order statistics of the extended observation vector and the second-order statistics of noise.

19 Claims, 5 Drawing Sheets

SYSTEM AND METHOD FOR SINGLE-CHANNEL SPEECH NOISE REDUCTION

FIELD OF THE INVENTION

The present invention is generally directed to systems and methods for reducing noise in single-channel inputs that include speech and noise, where the noise reduction is performed without speech distortion or with a specified level of speech distortion.

BACKGROUND INFORMATION

Noise reduction is a technique widely used in speech applications. When a microphone captures human speech and converts the human speech into speech signals for further processing, noise such as background ambient noise, may also be captured along with the desired speech signal. Thus, the overall captured (or observed) signals from microphones may include both the desired speech signal and a noise component. It is usually desirable to remove or reduce the noise component in the observed signal to a specified level prior to any further processing of the human speech.

Human speech captured using a single microphone is commonly referred to as a single-channel speech input. Current art for single-channel noise reduction (the process to remove or reduce the noise component from the single-channel speech input) models an input signal y(t) captured at a microphone as a speech signal x(t) along with an additive noise component v(t), or y(t)=x(t)+v(t), where t is a time index. In practice, y(t) is processed through a series of frames over a time axis. The input signal y(t) sensed by the microphone is transformed into a time-frequency domain representation Y(k, m), where 'k' is a frequency index and 'm' represents an index for time frames, using time-frequency transformations such as a Short-Time Fourier transform (STFT). Thus, after the transformation, Y(k, m)=X(k, m)+V(k, m). The statistics for the noise component V(k, m) may be estimated during silence periods (or periods when there is no detected human voice activities). To reduce noise, current art applies a noise reduction filter H(k, m) to the input signal Y(k, m). The noise reduction filter H(k, m) is designed to minimize the spectrum energy of the noise component V(k, m) for the current frame m. The current art, which tries to reduce noise based on the current time frame m, implicitly assumes that Y(k, m) is uncorrelated from one frame to another.

DETAILED DESCRIPTION OF EXAMPLE EMBODIMENTS

Figure 1:
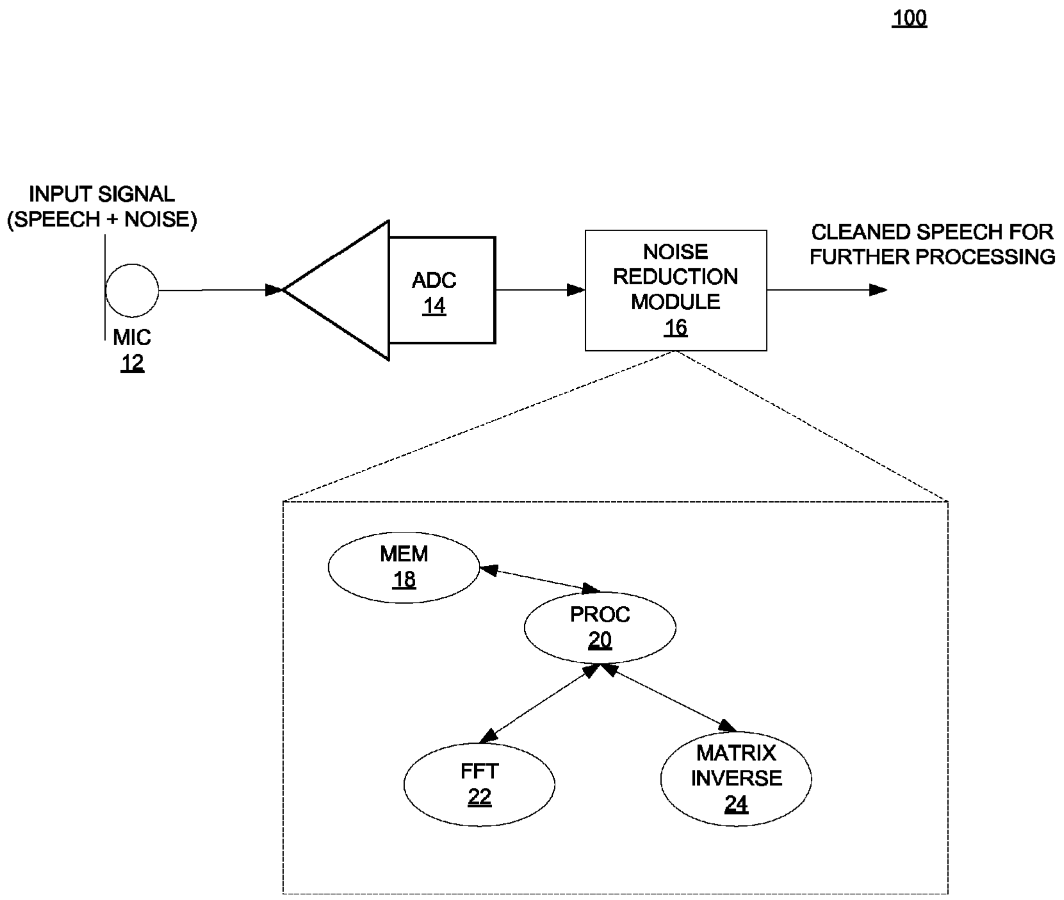
FIG. 1 illustrates a system that includes a noise reduction module according to an exemplary embodiment of the present invention.

The noise reduction filter H(k, m) of the current art uses the time-frequency representations of the microphone signal within only the current frame to reduce the energy spectrum of the noise component v(t). This approach of the current art distorts the speech. Accordingly, there is a need for a system and method that may reduce speech noise without, at the same time, distorting the speech signal (called speech-distortionless noise reduction) for a single-channel speech input. Further, there is a need for a system and method that may reduce speech noise with respect to a specified level of speech distortion.

Embodiments of the present invention are directed to a system and method that may receive a single-channel input that may include speech and noise captured via a microphone. For each current frame of speech input, the system and method may perform a time-frequency transformation on the single-channel input over L (L>1) frames including the current frame to obtain an extended observation vector of the current frame, data elements in the extended observation vector representing the coefficients of the time-frequency transformation of the L frames of the single-channel input. The system and method may compute second-order statistics of the extended observation vector and second-order statistics of noise, and may construct a noise reduction filter for the current frame of the single-channel input based on the second-order statistics of the extended observation vector and the second-order statistics of noise.

Embodiments of the present invention may provide systems and methods for speech-distortionless single-channel noise reduction. Current art of single-channel noise reduction filters are designed based on an assumption that the input signal at a microphone is uncorrelated from one frame to another frame of the input signal. As a result, current art of single-channel noise reduction filters applies only a gain at each frequency to the time-frequency representation of the noisy microphone signal within the current frame, or H(k, m)*Y(k, m)=H(k, m)*X(k, m)+H(k, m)*V(k, m). Since the noise reduction filter H(k, m) affects both the noise V(k, m) and speech X(k, m), the speech X(k, m) is distorted as an undesirable side effect of the current art of single-channel noise reduction. In contrast to the current art, the present invention provides a noise reduction filter that takes into account, not only the time-frequency representation of the current frame, but also additional information such as information contained in frames preceding the current frame, a complex conjugate of the time-frequency representation of the current frame and its preceding frames, and/or information contained in neighboring frequencies of a specific frequency. An extended observation of the input signal may be constructed from one or more pieces of the additional information as well as the information contained in the time-frequency representation of the current frame. A speech-distortionless noise reduction filter may be constructed based on the extended observation of the input signal while taking into consideration of both the need to reduce an amount of the noise component and the need to preserve the speech at a specified level of distortion including the scenario of no speech distortion.

The single-channel noise reduction system of the present invention may be implemented in a number of ways. FIG. 1 illustrates a system that includes a noise reduction module according to an exemplary embodiment of the present invention. The system 10 may include a microphone 12, an analog-to-digital converter (ADC) 14, and a noise reduction module 16. The microphone 12 may capture an acoustic input signal including human speech and an additive noise component and may convert the acoustic input signal into an analog input signal. The ADC 14 coupled to the microphone 12 may convert the analog input signal into a digital input signal, which is referred to as the input signal in the following. The noise reduction module 16 coupled to the ADC 14 may perform speech-distortionless noise reduction on the input signal and output a cleaned version of the input signal for further processing such as speech recognition. The cleaned version of the input signal may be a speech input that includes less noise than the signal provided to the noise reduction module 16.

The noise reduction module 16 may be implemented on a hardware device that may further include a storage memory 18, a processor 20, and other, e.g., dedicated, hardware components such as a dedicated Fast Fourier transform (FFT) circuit for computing a FFT 22 and/or a matrix inversion circuit 24 for computing matrix inversions. The storage memory 18 may act as an input buffer to store the input signal digitized at the ADC 14. Further, the storage memory 18 may store machine-executable code that, when loaded into the processor 20, may perform methods of single-channel noise filtering on the stored input signal. The processor 20 may accelerate execution of the code with assistance from the dedicated hardware such as the dedicated FFT circuit 22 and the matrix inversion circuit 24. An output from the single-channel noise filtering may also be stored in the memory storage 18. The output may be a cleaned speech signal ready for further processing.

Figure 2:
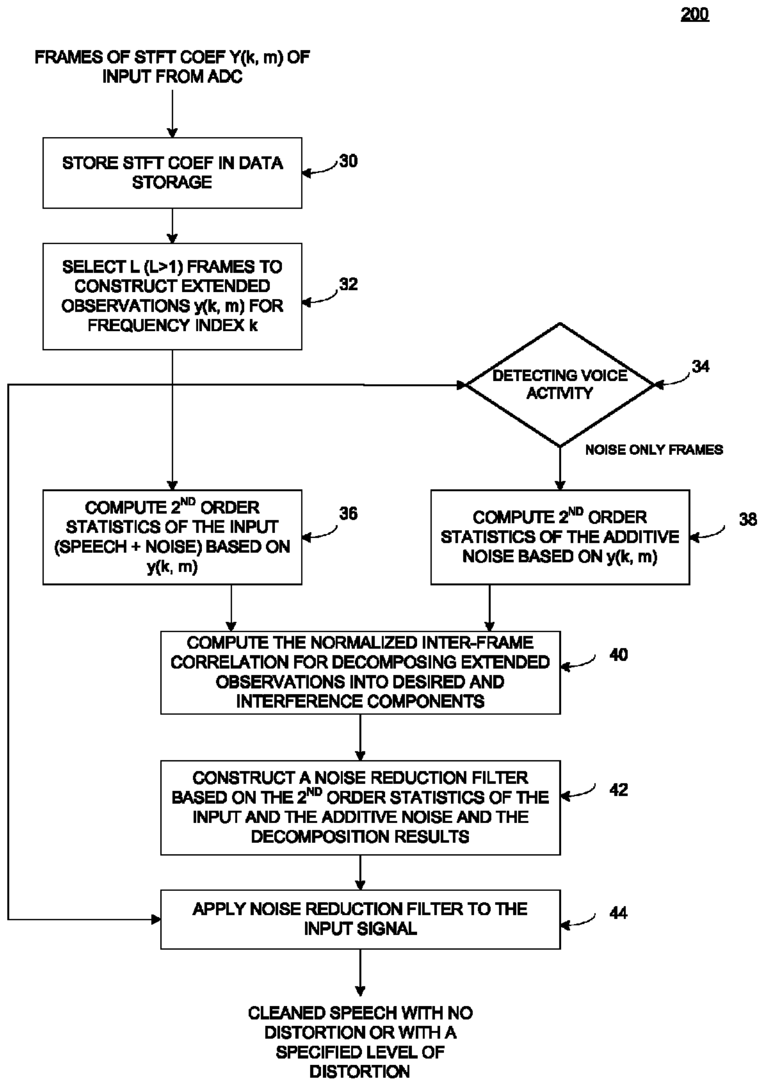
FIG. 2 is a flowchart that illustrates a method of single-channel noise reduction according to an exemplary embodiment of the present invention.

FIG. 2 illustrates a method 200 of single-channel noise reduction according to an exemplary embodiment of the present invention. The method of FIG. 2 may be performed by the exemplary system illustrated in FIG. 1. Referring to FIG. 2, the input signal y(t) in the form of a sequence of data samples from an ADC may be converted using a time-frequency transformation into a data array Y(k, m) representing a frequency spectrum for frame m, where k is a frequency index. In one exemplary embodiment, the time-frequency transformation may be a short-time Fourier transform (STFT), and the data array Y(k, m) may correspond to the coefficients of the STFT for frame m at frequency k. However, the present invention may not be limited to STFT. Other types of time-frequency transformation such as wavelet transforms may also be used to convert the input signal. For convenience, the following is discussed in terms of STFT coefficients Y(k, m), where k is a frequency index, and m is a frame index.

Figure 5:
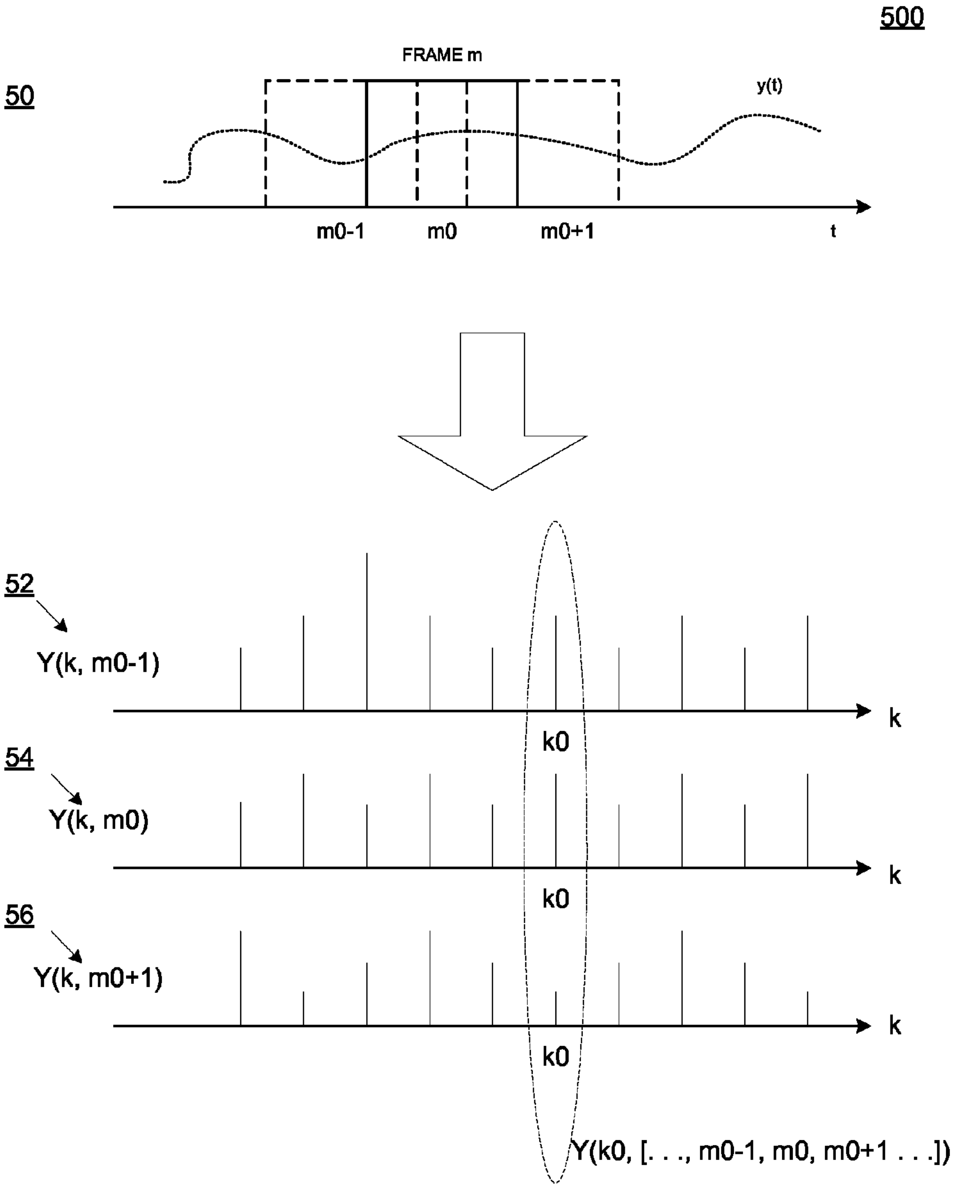
FIG. 5 illustrates a time-frequency transformation of a signal.

FIG. 5 illustrates a time-frequency transformation of a signal and may help understand the STFT as used in the context of the present invention. As shown at 50 of FIG. 5, the input signal y(t) in the form of a sequence of data samples may be processed via a series of overlapping frames (or windows). These frames may be indexed as ( . . . $m_0-1$, $m_0$, $m_0+1$, . . . ). The STFT may be a Fourier transform applied to each of these frame. The time-frequency transformation of the data within each frame may form a respective sequence of STFT coefficients. Thus, the coefficients of the STFT as applied to the framed y(t) may be a stack of Y(k, m), 52, 54, 56, that may include both a frequency index k and a frame index m. With respect to a specific frequency k0, Y(k, m) may be an extended observation vector Y(k0, m) of STFT coefficients at frequency k0 for frames ( . . . $m_0-1$, $m_0$, $m_0+1$ . . . ).

Referring again to FIG. 2, at 30, received STFT coefficients Y(k, m) may be stored in a data storage acting as a buffer. At 32, instead of processing the STFT coefficients for each frame on an individual basis, the processor may select L (L>1) frames of STFT coefficients Y(k, m) for designing a speech-distortionless noise reduction filter with respect to a specific frequency k0. In one exemplary embodiment, the current frame and L−1 preceding frames may be selected. The selected L frames y(k0, m)=[Y(k0, m−(L−1)), Y(k0, m−(L−2)), . . . , Y(k0, m)] for a specific frequency k0 may constitute an extended observation vector at frequency k0. In practice, the extended observation vector y(k, m) may be constructed successively for each current frame m that is being processed.

The method 200 may further process the extended observation vector y(k, m) via two sub-processes that may occur in parallel. At 36, the processor may calculate $2^{nd}$ order statistic values from the extended observation vector y(k, m) where y(k, m) may include both a speech signal component x(k, m) and a noise component v(k, m) for the L frames in the extended observation. The $2^{nd}$ order statistics of y(k, m) may include a correlation matrix of y(k, m). To calculate the $2^{nd}$ order statistics of y(k, m), a plurality of y(k, m) may form a collection of samples. In one exemplary embodiment, the sample size may include 8000 samples. The correlation matrix $\Phi_y$ (k)=E [y(k, m) $y^H$(k, m)], where $\Phi_y$ is an L by L matrix, E is an expectation operation over time (or over frames), and the H denotes a transpose-conjugation operation. In practice, the $2^{nd}$ order statistic values of y(k, m) of the current frame may be calculated recursively from the $2^{nd}$ order statistic values of its previous frames. For example, in one embodiment, $\Phi_y$ (k, m)=$\lambda_y$*$\Phi_y$ (k, m+1)+D$\Phi_y$ (k, m), where $(1)_y$ (k, m) is a recursive estimate of $\Phi_y$ (k) (and therefore is also a function of m), $\lambda_y$ is a forgetting factor that may be a constant, and D$\Phi_y$(k, m) is the incremental contribution of $2^{nd}$ order statistic values from the current frame m. Further, the observed values of y(k, m) may include both scenarios where y(k, m) includes both a speech component and a noise component or where y(k, m) includes only the noise component (i.e., during periods that have no detectable voice activities). Thus, at 36, the $2^{nd}$ order statistics of y(k, m) may be calculated regardless the content of y(k, m).

Concurrently with step 36, a voice activity detector (VAD) may also receive the STFT coefficients and perform, at 34, a voice activity detection on the current frame of the observed Y(k, m) to determine whether the current frame is a silent period. The VAD used at 34 may be an appropriate VAD that is known to persons of ordinary skills in the art. In the event that the VAD may determine that the current frame does not include human voice activities (i.e., a speech silence frame), the extended observation vector y(k, m)=[Y(k, m−(L−1)), Y(k, m−(L−2)), . . . , Y(k, m)] may be denoted as a noise only observation or alternatively, v(k, m)=[V(k, m−(L−1)), V(k, m−(L−2)), . . . , V(k, m)], where v represents a noise only extended observation, and V is frames in the noise only observation. The $2^{nd}$ order statistics of v(k, m) may be calculated at 38. For example, the correlation matrix for v(k, m) may be $\Phi_v$(k)=E [v(k, m) $v^H$(k, m)], where $\Phi_v$ may be an L by L matrix, E is an expectation operation over time, and the H denotes a transpose-conjugation operator. Thus, the observed y(k, m) may be considered as y(k, m)=x(k, m)+v(k, m). Since the noise component v(k, m) is a signal that often varies much less than the speech signal, the statistics of v(k, m) calculated during silence periods may also be used as the noise characteristics during subsequent periods when there are voice activities. Also, due to the intermittent nature of voice activities (i.e., voice activities occur only from time to time), the sample size used to calculate the $2^{nd}$ order statistics of noise may be substantially smaller than the one used to calculate the $2^{nd}$ order statistics of y(k, m). In one exemplary embodiment, the sample size used to calculate the $2^{nd}$ order statistics of noise may include 2000 samples. In practice, the $2^{nd}$ order statistics $\Phi_v$(k) may be calculated recursively. In one embodiment, $\Phi_v$(k, m)=$\lambda_y$*$\Phi_v$(k, m+1)+D$\Phi_v$(k, m), where $\Phi_v$(k, m) is a recursive estimate of $\Phi_v$(k) (and therefore also may be a function of m), $\lambda_y$ is a forgetting factor that may be a constant, and D$\Phi_v$(k, m) is the incremental contribution of $2^{nd}$ order statistic values from the current frame m.

The vector of speech component x(k, m) may be further decomposed into a first potion that is correlated to the speech signal in the current frame X(k, m) and a second portion that is uncorrelated to X(k, m). For convenience, the first portion may be referred to as a desired speech vector $x_d(k, m)$, and the second portion may be referred to as an interference speech vector x'(k, m). Thus, $x(k, m)=x_d(k, m)+x'(k, m)=X(k, m)\gamma^*_X(k, m)+x'(k, m)$, where * is a complex conjugate operator, and $\gamma_x(k, m)=E[X(k, m)\, x^*(k, m)]/E[|X(k, m)|^2]$ is a (normalized) inter-frame correlation vector of speech. Thus, at 40, the inter-frame correlation vector $\gamma_x(k, m)$ may be computed for decomposing the extended observation y(k, m) into three mutually uncorrelated components of $x_d(k, m)$, x'(k, m) and v(k, m), or $y(k, m)=x_d(k, m)+x'(k, m)+v(k, m)$. Correspondingly, the variance matrix $\Phi_y(k, m)$ for y(k, m) may be the sum of the respective variance of $x_d(k, m)$, x'(k, m), and v(k, m), or $\Phi_y(k, m)=\Phi_{xd}(k, m)+\Phi_{x'}(k, m)+\Phi_v(k, m)$.

At 42, a speech-distortionless noise reduction filter may be constructed from these $2^{nd}$ order statistics and the decomposition of y(k, m). The interference component x'(k, m) and the noise component v(k, m) may be together referred to as an interference-plus-noise portion $x_{in}(k, m)$ of the extended observation, or $x_{in}(k, m)=x'(k, m)+v(k, m)$ with the covariance matrix $\Phi_{in}(k, m)=\Phi_{x'}(k, m)+\Phi_v(k, m)$ where, since a covariance matrix is proportionally related to the corresponding correlation matrix, covariance matrices are used in the same sense as correlation matrices. Thus, a minimum variance distortionless response (MVDR) filter h(k, m) may be constructed so that h (k, m) may satisfy:

$$\min_{h(k,m)} h^H(k, m)\Phi_{in}(k, m)h(k, m), \quad \text{subject to} \quad h^H(k, m)\gamma_X^*(k, m) = 1. \tag{1}$$

In one exemplary embodiment of the present invention, an MVDR filter $h_{MVDR}(k, m)$ may be formulated explicitly from the statistics of the extended observation and the noise during silent periods as $$h_{MVDR}(k, m) = \frac{\Phi_y^{-1}(k, m)\gamma_X^*(k, m)}{\gamma_X^T(k, m)\Phi_y^{-1}(k, m)\gamma_X^*(k, m)}, \tag{2}$$

where $$\gamma_X(k, m) = \frac{\phi_Y(k, m)}{\phi_Y(k, m) - \phi_V(k, m)}\gamma_Y(k, m) - \frac{\phi_V(k, m)}{\phi_Y(k, m) - \phi_V(k, m)}\gamma_V(k, m), \tag{3}$$

where $\gamma_Y(k, m)$ and $\gamma_V(k, m)$ are respectively the normalized inter-frame correlation vectors for y(k, m) and v(k, m), and $\phi_Y(k, m)$ and $\phi_V(k, m)$ are respectively the variance of y(k, m) and v(k, m). Thus, the MVDR filter $h_{MVDR}(k, m)$ may be constructed from statistics of the extended observation y(k, m) and the statistics of noise component measured during silence periods.

In another exemplary embodiment, the MVDR filter $h_{MVDR}(k, m)$ may be formulated in terms of statistics of the interference-plus-noise portion $x_{in}(k, m)$ of the extended observation as $$h_{MVDR}(k, m) = \frac{\Phi_{in}^{-1}(k, m)\gamma_X^*(k, m)}{\gamma_X^T(k, m)\Phi_{in}^{-1}(k, m)\gamma_X^*(k, m)} = \frac{\Phi_{in}^{-1}(k, m)\Phi_y(k, m) - I_{L\times L}}{tr[\Phi_{in}^{-1}(k, m)\Phi_y(k, m)] - L}i_1, \tag{4}$$

where $\Phi_{in}$ as discussed above is the covariance matrix of the interference-plus-noise portion $x_{in}(k, m)$, $I_{L\times L}$ is an identity matrix of L by L, $i_1$ is the first column of the identity matrix $I_{L\times L}$, tr[ ] denotes the trace operator on a square matrix, and T is a transpose operator. Compared to equation (3) which may need to compute the inverse matrix of $\Phi_y$, the MVDR filter $h_{MVDR}(k, m)$ as formulated in equation (4) may need to compute the inverse matrix of $\Phi_{in}$. Since, in practice, $\Phi_{in}$ may have a smaller condition number than $\Phi_y$, the MVDR filter $h_{MVDR}(k, m)$ as derived from equation (4) may be numerically more stable and involve less amount of computation than equation (3).

The filter $h_{MVDR}(k, m)$ of equation (1), constructed subject to $h^H(k,m)\gamma^*_X(k, m)=1$, may be distortionless with respect to the speech. In other embodiments, a noise reduction filter may be constructed based on a trade-off between an amount of noise reduction and a level of speech distortion that may be tolerated. It is noted that the amount of noise after filtering may be written as $h^H(k,m)\Phi_{in}(k,m)h(k,m)$ and the level of speech distortion may be represented by $|h^H(k,m)\gamma^*_X(k,m)-1|^2$. Thus, when the amount of noise is minimized subject to the condition of no speech distortion which may be mathematically formulated as $h^H(k,m)\gamma^*_X(k,m)=1$, the filter is the MVDR filter as discussed above. In other embodiments, to increase the amount of noise reduction, as a trade-off, a certain level of speech distortion may be allowed. This may be formulated by minimizing the level of speech distortion subject to the condition that the level of noise is reduced by a factor of β, where 0<β<1. In one embodiment, the filter h(k, m) constructed under a specified level of speech distortion may be expressed as $$h_\mu(k, m) = \frac{\phi_X(k, m)\Phi_y^{-1}(k, m)\gamma_X^*(k, m)}{\mu + (1-\mu)\phi_X(k, m)\gamma_X^T(k, m)\Phi_y^{-1}(k, m)\gamma_X^*(k, m)}. \tag{5}$$

where μ>0 may be calculated as a function of β as an indictor of the specified level of speech distortion. In the specific situation where μ=1, the constructed filter $h_\mu(k,m)$ may be a Wiener filter that may minimize the noise with little or no regard to the speech distortion. In the specific situation where μ=0, $h_\mu(k,m)$ may be the MVDR filter that may preserve the speech with no speech distortion. In the specific situations where 0<μ<1, $h_\mu(k,m)$ may be a filter that may have a level of residual noise and have a speech distortion between those of the Wiener filter and the MVDR filter. In the specific situations where μ>1, $h_\mu(k,m)$ may be a filter that may have a lower level of residual noise but a higher level of speech distortion than that of the Wiener filter.

In the specific situation that μ=1, the constructed filter $h_1(k, m)$ may be a Wiener filter or a filter that may minimize the noise with little or no regards to the speech distortion.

After a noise reduction filter is constructed, the constructed MVDR filter $h_{MVDE}(k, m)$ or a filter with a specified level of distortion may be applied, at 44, to the extended observation y(k, m) to obtain the desired distortionless speech component of the current frame (or a speech component with a specified level of distortion).

The length (L) of the extended observation vector y(k, m) may determine the performance of the constructed MVDR filter $h_{MVDR}(k, m)$ (or the filter with specified level of distortion) in terms of signal to noise ratio (SNR). It is observed that the longer the extended observation vector y(k, m), the better the SNR. On the other hand, a longer extended observation vector y(k, m) may increase the amount of computation, and thus the cost of constructing the MVDR filter. It is also observed that after a certain length, any further lengthening of the extended observation vector may provide only marginal SNR improvement. According to an embodiment of the present invention, the length of the extended observation vector may be in a range of 2 to 16 sample points. Further, according to a preferred embodiment of the present invention, the length of the extended observation vector may be in a range of 4 to 12 sample points.

The method as described in FIG. 2 relates to one type of the extended observation of the input signal at a microphone. Other types of extended observations may also be used to construct the MVDR filter $h_{MVDR}(k, m)$ in a similar manner. In one exemplary embodiment, the extended observation may be constructed from Y(k, m) and its complex conjugate Y*(k, m). Thus, the extended observation vector of the input signal y(k, m)=[Y(k, m−L+1), Y(k, m−L+2), . . . , Y(k, m), Y*(k, m−(L−1)), Y*(k, m−(L−2)), . . . , Y*(k, m)]. The extended observation vector y(k, m) constructed in this way may have a length of 2 L. Once the extended observation vector y(k, m) is constructed, the MVDR filter $h_{MVDR}(k, m)$ may be constructed in a process similar to that described in FIG. 2.

Figure 3:
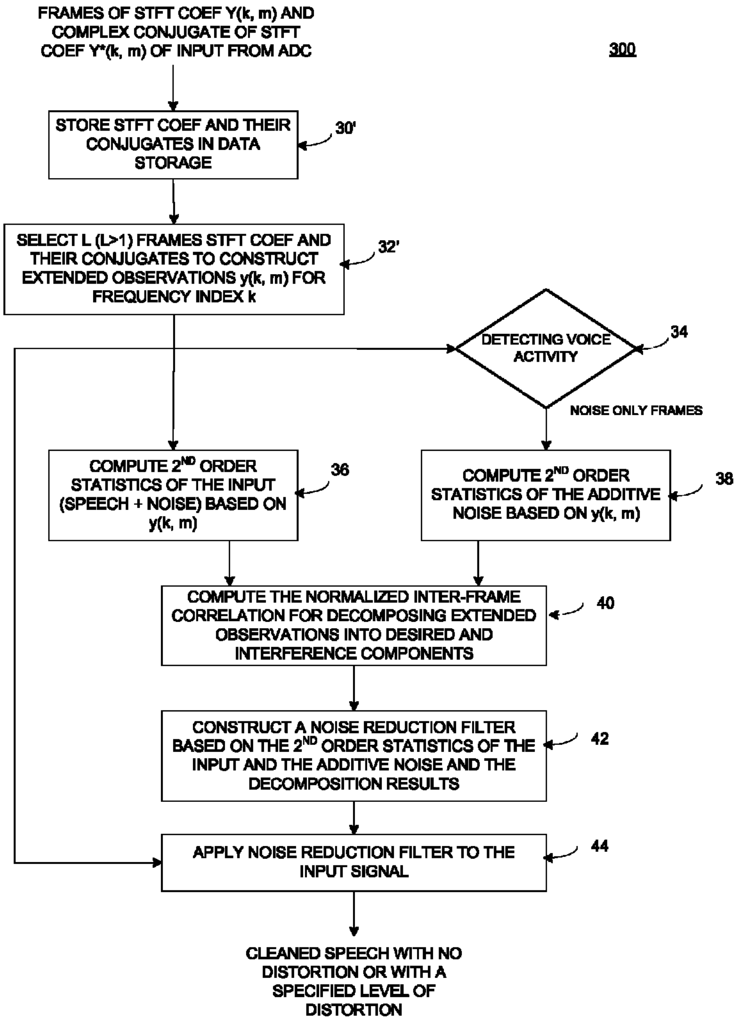
FIG. 3 is a flowchart that illustrates another method of single-channel noise reduction according to an exemplary embodiment of the present invention.

FIG. 3 illustrates such a method to construct an MVDR filter $h_{MVDR}(k, m)$ according to an exemplary embodiment of the present invention. The method illustrated in FIG. 3 includes steps similar to the method illustrated in FIG. 2 except for steps 30' and 32'. At 30', the STFT coefficients Y(k, m) and its complex conjugate Y*(k, m) may be stored in a data storage that may be accessible by a processor. Subsequently, at 32', the processor may select L (L>1) frames of STFT coefficients and their respective complex conjugates to construct an extended observation vector y(k, m)=[Y(k, m−L+1), Y(k, m−L+2), . . . , Y(k, m), Y*(k, m−L+1), Y*(k, m−L+2), . . . , Y*(k, m)] of a length 2 L for a frequency index k. After the extended observation vector y(k, m) is constructed, the MVDR filter $h_{MVDR}(k, m)$ may be constructed to filter the input signal following the steps 36 to 44 as described above in conjunction with FIG. 2.

The extended observation vector y(k, m) as described in the embodiments of FIGS. 2 and 3 may be constructed from observations with respect to a specific frequency k. In other embodiments, the extended observation vector y(k, m) may be constructed from observations at the frequency k, but also from observations at frequencies neighboring k. For example, y(k, m) may be constructed to include information from its nearest neighbors so that y(k, m)=[Y(k−1, m−(L−1)), Y(k−1, m−(L−2)), . . . , Y(k−1, m), Y(k, m−(L−1)), Y(k, m−(L−2)), . . . , Y(k, m), Y(k+1, m−(L−1)), Y(k+1, m−(L−2)), . . . , Y(k+1, m)] to form an extended observation vector of a length of 3 L. This extended observation vector y(k, m) may be similarly used to construct an MVDR filter $h_{MVDR}(k, m)$ as described in FIGS. 2 and 3.

Figure 4:
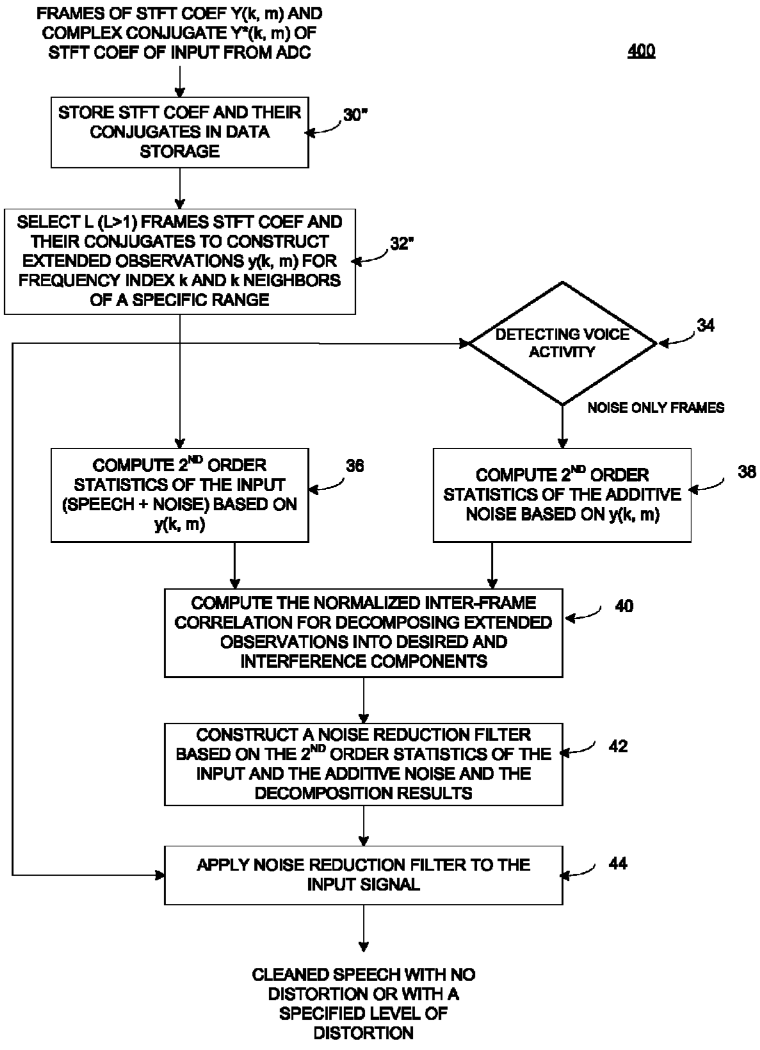
FIG. 4 is a flowchart that illustrates yet another method of single-channel noise reduction according to an exemplary embodiment of the present invention.

FIG. 4 illustrates a method of using information at neighboring frequencies to construct MVDR filter according to an exemplary embodiment of the present invention. The method illustrated in FIG. 4 includes steps similar to the methods illustrated in FIGS. 2 and 3 except for steps 30" and 32". At 30", the STFT coefficients Y(k, m) and its complex conjugate Y*(k, m) of different frequencies may be stored in a data storage that may be accessible by a processor. At 32", the processor may select L (L>1) frames of STFT coefficients at frequency k and its neighboring frequencies within a range to construct an extended observation vector y(k, m). After the extended observation vector y(k, m) is constructed, the MVDR filter $h_{MVDR}(k, m)$ may be constructed to filter the input signal following the steps 36 to 44 as described above in conjunction with FIGS. 2 and 3.

Although embodiments of the present invention are discussed in light of a single channel input, the present invention may be readily applicable to noise reduction for multiple channel inputs. For example, in one embodiment, the multiple channel inputs may be separated into multiple single-channel inputs. Each of the single-channel inputs may be filtered in accordance to the methods as described in FIGS. 2 to 4.

An example embodiment of the present invention is directed to a processor, which may be implemented using a processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape.

An example embodiment of the present invention is directed to a hardware computer-readable medium, e.g., as described above, having stored thereon instructions executable by a processor to perform the methods described herein.

An example embodiment of the present invention is directed to a method, e.g., of a hardware component or machine, of transmitting instructions executable by a processor to perform the methods described herein.

Those skilled in the art may appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A method for processing a single-channel input including speech and noise, comprising:

receiving, by a processor, the single-channel input captured via a microphone;

for processing a current frame of the single-channel input:

performing, by the processor, a time-frequency transformation on the single-channel input over L frames including the current frame to obtain an extended observation vector of the current frame, data elements in the extended observation vector representing coefficients of the time-frequency transformation of the L frames of the single-channel input;

computing, by the processor, second-order statistics of the extended observation vector;

if the current frame of the single-channel input does not include detectable human voice activity, computing, by the processor, second-order statistics of noise contained in the single-channel input;

constructing, by the processor, a noise reduction filter for the current frame of the single-channel input based on the second-order statistics of the extended observation vector and the second-order statistics of noise; and applying the noise reduction filter to the single-channel input to reduce an amount of noise;

wherein L>1.

2. The method of claim 1, further comprising:

applying the noise reduction filter to the single-channel input to produce a filtered version of the single-channel speech input.

3. The method of claim 1, wherein the time-frequency transformation is a short-time Fourier transform (STFT), and the coefficients are STFT coefficients.

4. The method of claim 1, further comprising including data elements representing complex conjugates of the coefficients of the time-frequency transformation of the L frames of the single-channel input in the extended observation data vector.

5. The method of claim 1, further comprising including data elements representing the coefficients of the time-frequency transformation within a predetermined range of neighboring frequencies of the L frames of the single-channel input in the extended observation data vector.

6. The method of claim 1, further comprising:

decomposing the extended observation vector into a desired component of the speech and an interference component of the speech, wherein the desired component is statistically unrelated to the interference component, the desired component is related to the speech through a normalized inter-frame correlation vector $\gamma_X(k, m)$, where k is a frequency index and m is a frame index, and the interference component and the noise component form an interference-plus-noise component of the extended observation vector; and constructing the noise reduction filter as h(k, m) such that the h(k, m) minimizes the level of speech distortion represented by $|h^H(k,m)\gamma_X^*(k,m)-1|^2$, subject to a specified level of the residual interference plus noise component indicated as $h^H(k, m)\Phi_{in}(k,m)h(k,m)=\beta\phi_V(k,m)$, where β is a constant and $\phi_V(k,m)$ is a variance of noise in the input, wherein 0<β<1.

7. The method of claim 6, wherein the constructed noise reduction filter $$h_\mu(k,m) = \frac{\phi_X(k,m)\Phi_y^{-1}(k,m)\gamma_X^*(k,m)}{\mu + (1-\mu)\phi_X(k,m)\gamma_X^T(k,m)\Phi_y^{-1}(k,m)\gamma_X^*(k,m)},$$

wherein μ is a number and is determined as a function of β, wherein μ≥0.

8. The method of claim 7, wherein μ=0, and the filter is a minimum variance distortionless response (MVDR)

$$\text{filter } h_{MVDR}(k,m) = \frac{\Phi_y^{-1}(k,m)\gamma_X^*(k,m)}{\gamma_X^T(k,m)\Phi_y^{-1}(k,m)\gamma_X^*(k,m)},$$

where $\Phi_y(k,m)$ is a correlation matrix of the extended observation vector y(k, m), and $\gamma_X(k,m)$ is the normalized inter-frame correlation vector that depends on the second-order statistics of the extended observation vector and the second-order statistics of noise.

9. The method of claim 7, wherein μ=0, and the filter is a minimum variance distortionless response (MVDR) filter $$h_{MVDR}(k,m) = \frac{\Phi_{in}^{-1}(k,m)\Phi_y(k,m) - I_{L\times L}}{tr[\Phi_{in}^{-1}(k,m)\Phi_y(k,m)] - L} i_1,$$

where $\Phi_{in}$ is a covariance matrix of the interference-plus-noise component of the speech, $I_{L\times L}$ is an identity matrix of L by L, $i_1$ is the first column of the identity matrix, tr[ ] denotes a trace operator, and T is a transpose operator.

10. A system of reducing noise in a single-channel input including speech and noise, comprising:

a data storage;

a processor configured to:

receive the single-channel input captured via a microphone;

for processing a current frame of the single-channel input:

perform, a time-frequency transformation on the single-channel input over L frames including the current frame to obtain an extended observation vector of the current frame, data elements in the extended observation vector representing the coefficients of the time-frequency transformation of the L frames of the single-channel input;

compute second-order statistics of the extended observation vector;

if the current frame of the single-channel input does not include detectable human voice activity, compute second-order statistics of noise contained in the single-channel input; and construct a noise reduction filter for the current frame of the single-channel input based on the second-order statistics of the extended observation vector and the second-order statistics of noise, wherein L>1.

11. The system of claim 10, wherein the processor further is configured to apply the noise reduction filter to the single-channel input to produce a filtered version of the speech input.

12. The system of claim 10, wherein the time-frequency transformation is a short-time Fourier transform (STFT), and the coefficients are STFT coefficients.

13. The system of claim 10, wherein the processor further is configured to include data elements representing complex conjugates of the coefficients of the time-frequency transformation of the L frames of the single-channel input in the extended observation data vector.

14. The system of claim 10, wherein the processor further is configured to include data elements representing the coefficients of the time-frequency transformation within a predetermined range of neighboring frequencies of the L frames of the single-channel input in the extended observation data vector.

15. The system of claim 10, wherein the processor further is configured to decompose the extended observation vector into a desired component of the speech and an interference component of the speech, wherein the desired component is statistically unrelated to the interference component, the desired component is related to the speech through an inter-frame correlation vector $\gamma_X(k,m)$, where k is a frequency index and m is a frame index, and the interference component and the noise component form an interference-plus-noise component of the extended observation vector; and construct the noise reduction filter as h(k, m) such that the h(k, m) minimizes the level of speech distortion represented by $|h^H(k,m)\gamma^*_X(k,m)-1|^2$, subject to a specified level of the residual interference plus noise component indicated as $h^H(k,m)\Phi_{in}(k,m)h(k,m)=\beta\phi_V(k,m)$ where β is a constant and $\phi_V(k,m)$ is a variance of noise in the input, wherein 0<β<1.

16. The system of claim 15, wherein the constructed noise reduction filter $$h_\mu(k,m)=\frac{\phi_X(k,m)\Phi_y^{-1}(k,m)\gamma_X^*(k,m)}{\mu+(1-\mu)\phi_X(k,m)\gamma_X^T(k,m)\Phi_y^{-1}(k,m)\gamma_X^*(k,m)},$$

wherein μ is a number and is determined as a function of β, wherein μ≥0.

17. The system of claim 16, wherein the μ=0, and the filter is a minimum variance distortionless response (MVDR) filter $$h_{MVDR}(k,m)=\frac{\Phi_y^{-1}(k,m)\gamma_X^*(k,m)}{\gamma_X^T(k,m)\Phi_y^{-1}(k,m)\gamma_X^*(k,m)},$$

where $\Phi_y(k, m)$ is a correlation matrix of the extended observation vector y(k, m), and $\gamma_X(k, m)$ is the normalized interframe correlation vector that depends on the second-order statistics of the extended observation vector and the second-order statistics of noise.

18. The system of claim 16, wherein the μ=0, and the filter is a minimum variance distortionless response (MVDR) filter $$h_{MVDR}(k,m)=\frac{\Phi_{in}^{-1}(k,m)\Phi_y(k,m)-I_{L\times L}}{tr[\Phi_{in}^{-1}(k,m)\Phi_y(k,m)]-L}i_1,$$

where $\Phi_{in}$ is a covariance matrix of the interference-plus-noise component, $I_{L\times L}$ is an identity matrix of L by L, $i_1$ is the first column of the identity matrix, tr[ ] denotes a trace operator, and T is a transpose operator.

19. A computer-readable non-transitory medium stored thereon executable codes that, when executed, performs a method for processing a single-channel input including speech and noise, the method comprising:

receiving, by a processor, the single-channel input captured via a microphone;

for processing a current frame of the single-channel input:

performing, by the processor, a time-frequency transformation on the single-channel input over L frames including the current frame to obtain an extended observation vector of the current frame, data elements in the extended observation vector representing the coefficients of the time-frequency transformation of the L frames of the single-channel input;

computing, by the processor, second-order statistics of the extended observation vector;

if the current frame of the single-channel input does not include detectable human voice activity, computing, by the processor, second-order statistics of noise contained in the single-channel input; and constructing, by the processor, a noise reduction filter for the current frame of the single-channel input based on the second-order statistics of the extended observation vector and the second-order statistics of noise, wherein L>1.

* * * * *